United States Patent [19]

Roberts et al.

[11] Patent Number: 4,582,398
[45] Date of Patent: Apr. 15, 1986

[54] LARGE CONTINUOUSLY FOCUSABLE GAS LENSES

[75] Inventors: Thomas G. Roberts, Huntsville; Thomas E. Honeycutt, Somerville, both of Ala.

[73] Assignee: The United States of America as represented by the Secretary of the Army, Washington, D.C.

[21] Appl. No.: 572,348

[22] Filed: Jan. 20, 1984

[51] Int. Cl.⁴ ................................................ G02B 3/14
[52] U.S. Cl. ................................................... 350/419
[58] Field of Search .................................. 350/418, 419

[56] References Cited

U.S. PATENT DOCUMENTS 3,598,472  8/1971  Kaiser ................................. 350/418
4,331,388  5/1982  McCrobie et al. ................ 350/419
4,512,639  4/1985  Roberts et al. .................... 350/418

OTHER PUBLICATIONS

McMahon, "Liquid Optics . . . A New Horizon," The Surveyor, vol. 3, No. 4, 11/1967, pp. 26–28.

Primary Examiner—John K. Corbin
Assistant Examiner—Rebecca D. Gass
Attorney, Agent, or Firm—Anthony T. Lane; Robert P. Gibson; James T. Deaton

[57] ABSTRACT

Large optic gas lens are provided for outer space application and the lens are constructed so as to have the capability of adjusting the focusing ability of the lens to focus laser energy to targets spaced at variable distances from the lens.

5 Claims, 5 Drawing Figures

LARGE CONTINUOUSLY FOCUSABLE GAS LENSES

DEDICATORY CLAUSE

The invention described herein may be manufactured, used, and licensed by or for the Government for governmental purposes without the payment to us of any royalties thereon.

CROSS REFERENCE TO RELATED APPLICATIONS

This application is related to applicants' copending application Ser. No. 510,709, filed July 5, 1983, now U.S. Pat. No. 4,512,639, in that the lens of this invention can be used in the system disclosed in the prior application and this invention is also related to copending application Ser. No. 499,581, filed May 31, 1983, now U.S. Pat. No. 4,517,798, in that this invention could use a monopropellant gas generator as disclosed in this copending application.

BACKGROUND OF THE INVENTION

Space based laser weapons and other laser systems based in space are required to focus the laser beams on targets at great distances. To accomplish this requires focusing optics with very large output aperture. For example, the diameter of the exit aperture of the antenna or telescope can be determined from the range and desired laser spot size to be produced at the target. This diameter is given by:

$$D = \frac{\lambda}{e_T} R$$

where $\lambda$ is the wavelength of the laser being used, $e_T$ is the diameter of the focal spot at the target (or at the receiver if this happens to be a relay mirror), and R is the range or distance to the target. In some applications the exit aperture diameter may have to be 20 meters or larger and will be required to have near diffraction limited performance.

Such large good quality optics did not previously exist, and if one could be made by standard techniques then it would weigh so much that it could never be placed into space. For example, the mirror of the 200 inch (about 5 meters) telescope located at Mount Polomar, Colo., required more than four years to manufacture and weights much too much for current boosters. Also for defense applications, many very large optics are required, and for other applications more than one will be required. Because of this, much work has been done, and is being done, to develop lightweight large optics that might be made in parts and later erected in space. Although some progress has been made, these devices are still heavy, costly, much too small, and require too long to produce. Also, good optical quality is difficult to obtain and more difficult to maintain over these large diameters.

The gas dynamic lens used in application Ser. No. 510,709 overcomes many of these problems in that it can be erected in space when needed and can be repeatedly erected when necessary. It is lightweight, has the required large aperture and the optical quality problem is relaxed by the use of a gradually changing index of refraction rather than the discontinuous jump which the index of refraction suffers when solid optics are used (the solid-air interface discontinuity). This lens also has the advantage that it may be used with light from known high energy lasers.

However, it has the disadvantage of a fixed focal length and the disadvantage that it requires large volumes of gas if it is to be used for appreciably long times or for many times.

Therefore, it is an object of this invention to provide a large gas dynamic lens which can be used in outer space applications and which has the feature that its focal length can be varied so that the system may be focused on targets at different ranges.

Another object of this invention is to provide a large static gas lens which can have the focus thereof varied and which may be used with both cw and pulsed laser.

Still another object of this invention is to provide a static gas lens which does not require a large gas supply system and therefore a lens that can be used over a long period of time with a relatively small gas generator supply for prolonged use of the device.

Other objects and advantages of this invention will be obvious to those skilled in this art.

SUMMARY OF THE INVENTION

In accordance with this invention, large optic lenses are provided which include a large lens for use in outer space application. The lens can be varied in focal length so that laser light can be focused on targets at different ranges. The two-lens system disclosed in this application utilize gas from a source such as a gas generator and regulating means for regulating the flow of gas to the large diameter lens.

DESCRIPTION OF THE PREFERRED EMBODIMENT

Figure 1:
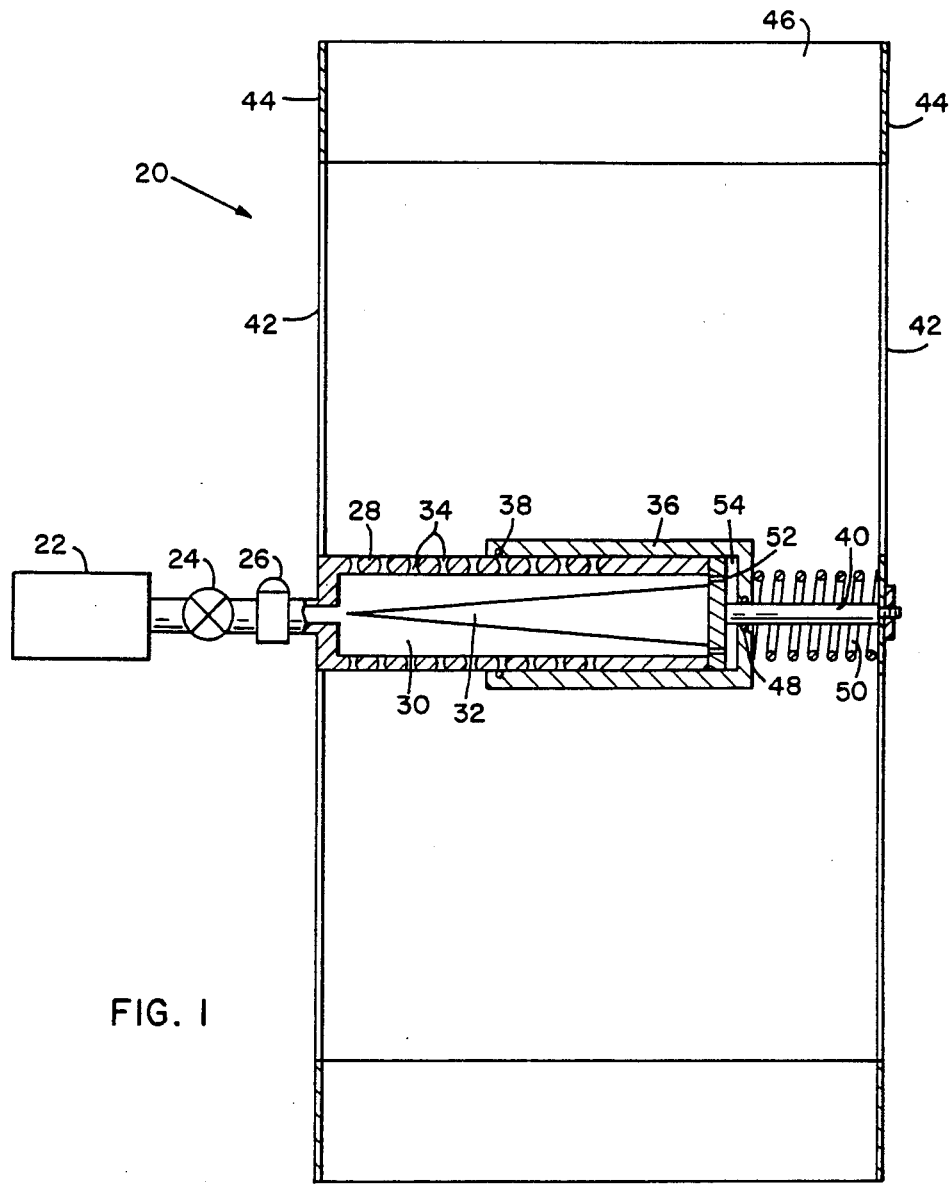
FIG. 1 is a schematic illustration of a large optic lens in accordance with this invention and showing a side view partially in section.

Referring now to the drawings, in FIG. 1 a gas dynamic lens 20 is illustrated which lens has a continuously variable focal length and said lens includes a high pressure gas supply 22 which may be a gas generator similar of that disclosed in applicants' application Ser. No. 499,581 or the gas generator may be any conventional gas generator or pressure supply sufficient for supplying the gas needed to the dynamic lens. Pressure supply 22 is connected through a fast acting valve 24 that is actuated at will to connect supply 22 to an adjustable high pressure regulator 26 that can have the desired pressure to be delivered at the outlet thereof selected by adjustment. Adjustable high pressure regulator 26 communicates with plenum structure 28 that defines therein a plenum chamber 30 with a blocking cone 32 mounted in the plenum chamber in a conventional manner. Plenum structure 28 has a multiplicity of gas dynamic nozzles 34 mounted completely around the circumference and lengthwise of the chamber as illustrated. A piston type sleeve 36 is slidably and sealably mounted by seal 38 on the outer surface of plenum structure 28. A rod like support structure 40 is connected at one end to plenum structure 28 in a conventional manner and the other end of rod 40 is connected by conventional means to three struts 42. The other end of plenum structure 28 has three struts 42 connected thereat in a conventional manner and struts 42 at opposite ends of the structure are connected at their radial most ends to end members 44 and end members 44 are inner connected by fins or veins 46. Piston 36 has an o-ring or other conventional type fluid seal 48 for sealing between the structure of piston 36 and rod 40. Spring means 50 is mounted about rod 40 and biases piston 36 to cover a portion of nozzles 34. A plurality of passages 52 communicate fluid pressure from chamber 30 to piston chamber 54. As can be seen, piston 36 covers part of plenum structure 28 on the outer surface thereof and cuts off a predetermined number of gas dynamic nozzles 34 until actuated against spring 50 to uncover these nozzles. Fins 46 as illustrated are held by end members 44 and struts 42 to help direct gas from the optic lens away from the lens proper in such a way that torque is not produced by the gases radiating into outer space which would tend to rotate the lens structure. It is also pointed out that cone 32 used in plenum structure 28 is such that the cross sectional area of the plenum chamber 30 decreases from front to back in such a way that the gas pressure is constant along the axis of the plenum chamber. That is, as gas enters plenum chamber 30 it tends to escape through nozzles 34. This tends to cause the pressure to drop along the axis of plenum chamber 30 and cause less gas to escape through nozzles 34 on one end than on the other if cone 32 is not used. This pressure drop is avoided, as is done in the flow system of some of the high energy repetively pulsed electric discharge lasers by the use of cone 32. High pressure regulator 26 is of such a structure that the desired pressure to be delivered to plenum chamber 30 is preselected to cause the desired pressure delivered by regulator 26 to control the pressure in plenum chamber 30 as desired by preprogramming the pressure to be delivered by high pressure regulator 26. The pressure in plenum chamber 30 communicates with chamber 54 by passages 52 and the pressures acting in chamber 54 on piston 36 act against spring 50 and piston 36 assumes an equilibrium position depending upon the pressure selected to be delivered by high pressure regulator 26. When a higher pressure is delivered to plenum chamber 30 by selecting a different setting for a higher pressure to be delivered by high pressure regulator 26, increase in this pressure moves piston 36 linearly so as to expose more of the gas dynamic nozzles 34 which decreases the focal length of the lens, and when the pressure is reduced in plenum chamber 30 by high pressure regulator 26 spring 50 moves piston 36 linearly so as to cover more of nozzles 34 which decreases the thickness of the lens and increases the focal length.

In operation, fast acting valve 24 is opened prior to the time that the lens is desired to be used to focus a laser beam from a laser. High pressure regulator 26 will be adjusted to cause the desired pressure to be delivered to plenum chamber 30. With these settings, gas from gas generator 22 will enter plenum chamber 30 where the pressure quickly builds up to a value determined by the particular setting of high pressure regulator 26. Pressure in plenum chamber 30 causes piston 36 to move linearly to its equilibrium position and the thermal energy in the gas in plenum chamber 30 is converted to directed kinetic energy as it exits through supersonic nozzles 34. This gas then expands at supersonic velocities toward fins 46 and from there on into outer space. This flow of the gas causes the density to decrease radially as $r^{-2}$, where r is a measure of the distance from the center line or axis of plenum chamber 30. Therefore, the index of refraction, n, also decreases radially as $r^{-2}$. It takes about one second for the flow field to be established radially between plenum structure 28 and fins 46, but after it is established, any light ray passing through will be bent toward the center line or the axis, which is the optical axis of the lens. Thus, this system behaves as a positive lens. Since index of refraction changes here are much more gradual than those for normal mirrors or lenses where solid densitites are encountered by the light waves, the problems with optical quality due to surface imperfection are not severe.

Once the flow field from nozzles 34 to fins 46 has been established, the source for the laser energy can be turned on or pulsed to focus the energy on a target. When it is desired to focus the energy to a different target, the system is then focused on a different target at a different range by setting the desired pressure on high pressure regulator 26 after which laser energy from a laser can be provided and focused by the lens. When it is no longer desired to use the lens, valve 24 is closed and the system is shut down. The system can now be used again at a later time by reopening valve 24 and going through the cycle as previously described. These cycles of use of lens 20 can be repeated as long as gas generator 22 can supply the required volume of gas.

Figure 3:
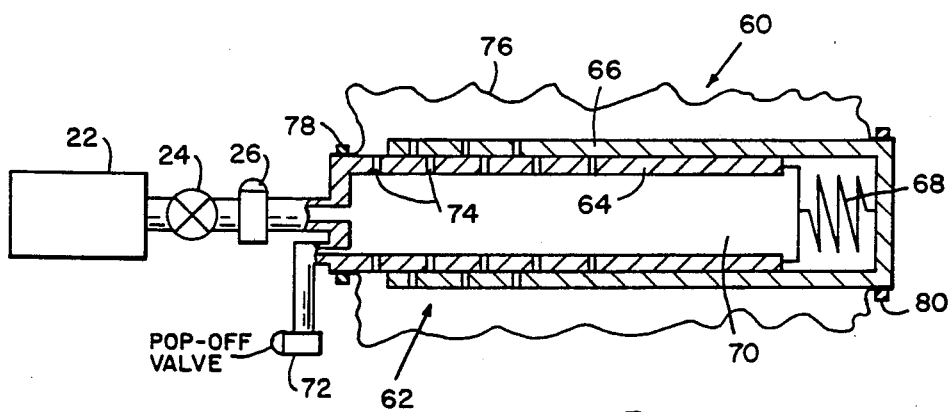
FIG. 3 is a schematic illustration of another large optic lens in accordance with this invention.
Figure 2:
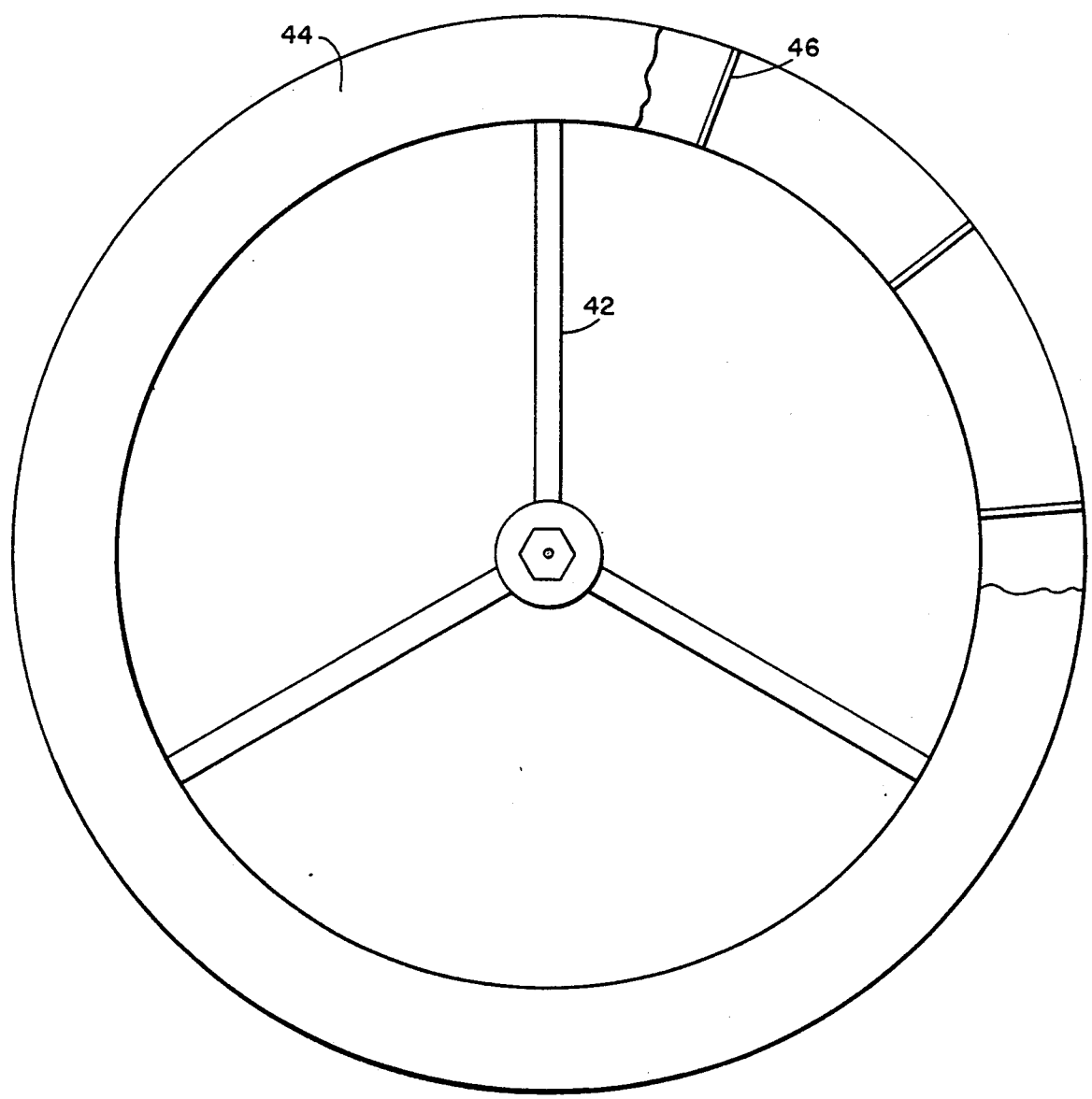
FIG. 2 is a schematic illustration of a front view of the lens with portions thereof cut away.

Referring now to FIG. 3, a gas lens 60 is shown which has a continously variable focal length and which requires very little gas (as compared to the lens of FIG. 1) for its deployment and use. This lens 60 includes gas supply 22 which may be a high pressure bottle or a gas generator as described for the embodiment of FIG. 1, a fast acting valve 24 for opening and closing the system for flow of gas from source 22 to the point of use, and adjustable high pressure dome type regulator 26 which is connected from fast acting valve 24 to plenum structure 62. Plenum structure 62 is comprised of two telescoping members 64 and 66 that are held telescoped together by spring means 68 and members 64 and 66 define plenum chamber 70 therebetween. An adjustable type pop-off valve 72 is connected to plenum chamber 70 as illustrated and acts to bleed off too great a pressure when this occurs. As illustrated, telescoping members 64 and 66 which form the plenum structure have a multiplicity of passages 74 for communicating gas from plenum chamber 70 to a balloon type structure 76 that is connected to telescoping member 64 and telescoping member 66 at one end of each of these members and the balloon structure is secured in a conventional manner as illustrated at 78 and 80. As will be appreciated, plenum structure 62 which includes telescoping members 64 and 66 is biased to a contracted telescoping position as illustrated in FIG. 3 by spring 68 and depending on the pressure delivered to plenum chamber 70, telescoping members 64 and 66 will telescope and move linearly relative to each other until the pressure in chamber 70 and the force exerted by spring 68 are balanced. It is also pointed out in this embodiment that no structure such as the cone of FIG. 1 is needed since it is only necessary to communicate the gas from chamber 70 to the space enclosed by balloon structure 76.

Figure 4:
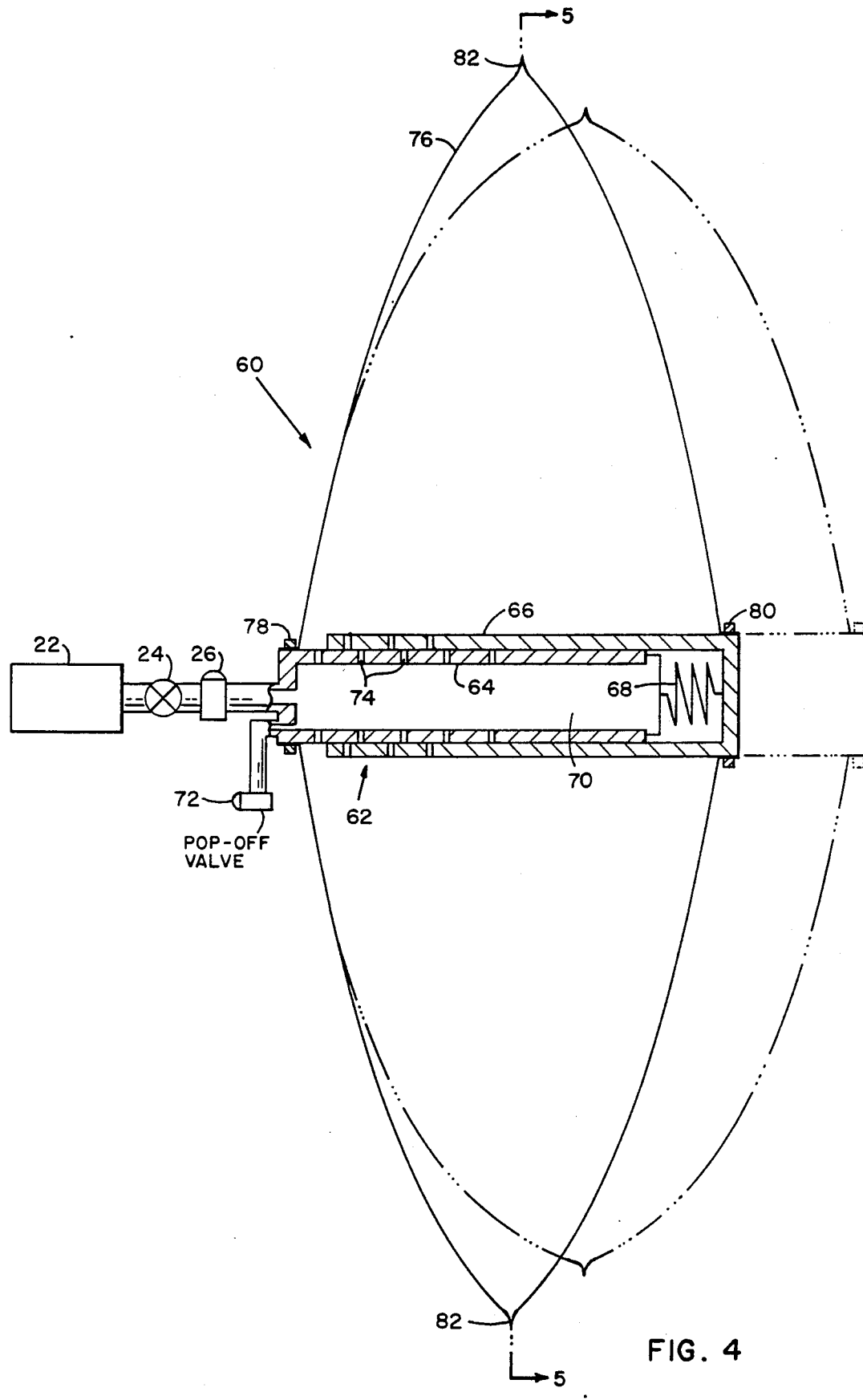
FIG. 4 is a schematic illustration of the lens of FIG. 3 and illustrating the lens in an inflated position in solid line and in an enlarged and second configuration in dot-dash lines.
Figure 5:
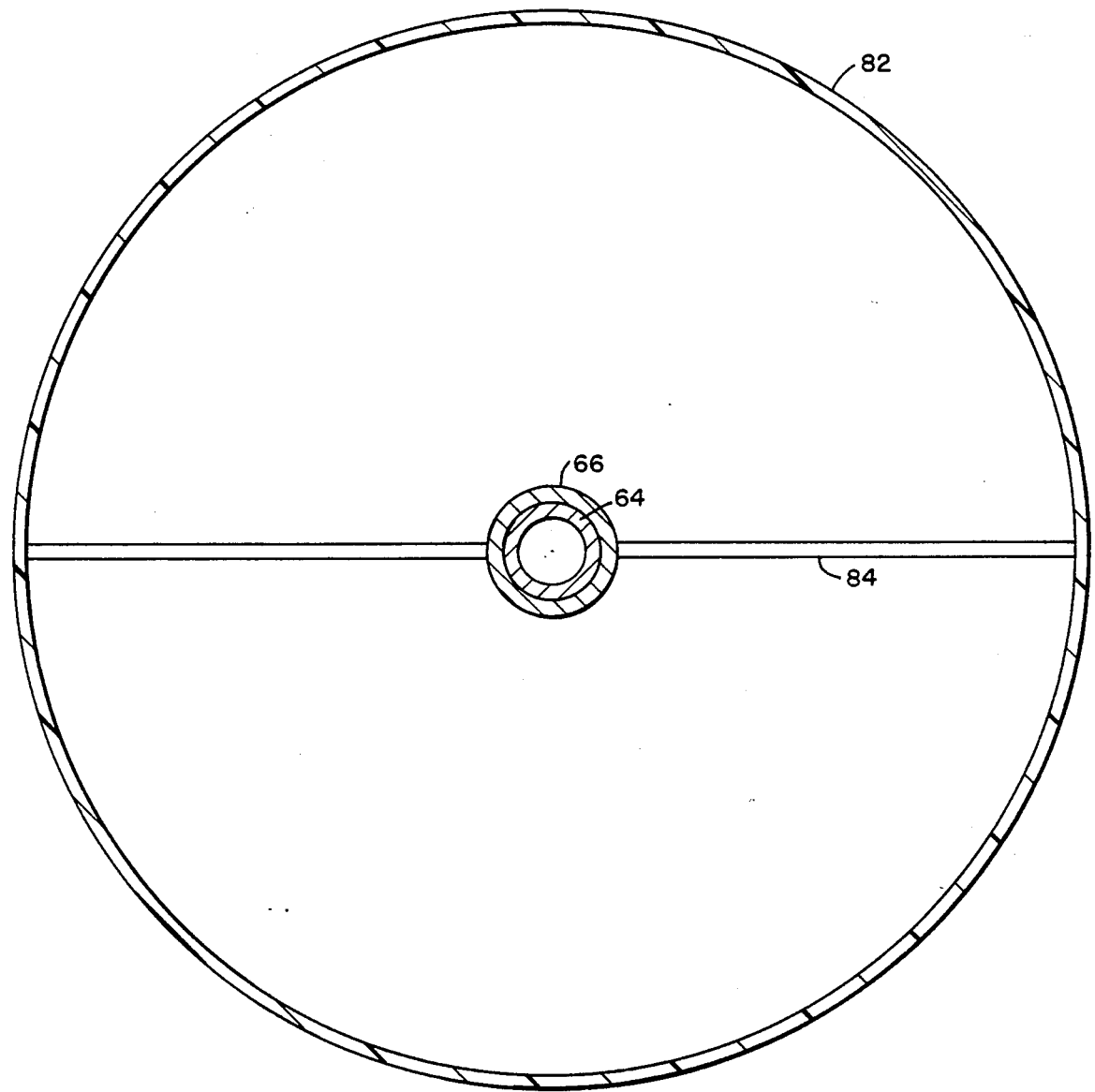
FIG. 5 is a sectional view along line 5—5 of FIG. 4, reduced in scale and schematically illustrating internal structure of the lens.

In FIG. 4, the gas lens is illustrated in a pressurized position and the balloon shaped structure 76 is illustrated as having a seam 82 at its outer periphery and in FIG. 5 two strips 84 are illustrated as being connected at seam 82 and at member 66 for limiting radial or outward ballooning of balloon shape member 76. Even though two members 84 are illustrated, any number of these members needed can be provided depending upon the size of the balloon and the pressures used to fill the balloon. These members will be made of the same materials as the balloon.

In operation, when it is desired to use the gas lens of FIG. 3, the desired pressure to be delivered to chamber 70 is selected by adjusting high pressure dome regulator 26 and pop-off valve 72 and then valve 24 is opened to allow gas to be supplied from source 22 to plenum chamber 70. This gas is supplied from plenum chamber 70 through passages 74 to the space or chamber enclosed by balloon structure 76 to inflate the balloon structure and as the pressure in plenum chamber 70 reaches full pressure, telescoping members 64 and 66 will assume a balance position against the force of spring 68 to determine the particular inflated configuration of balloon structure 76 by the particular pressure being delivered by regulator 26. The gas pressure and therefore the size of balloon structure 76 determines the length of the plenum structure and thereby the focal length of the lens. To decrease the focal length of the lens and thereby increase its focusing power, controls for high pressure regulator 26 and pop-off valve 72 are adjusted to increase the pressure delivered and maintained in plenum chamber 70 and the space enclosed by balloon 76. The increase in pressure increases (See dot-dash line position illustrated in FIG. 4) the length of the plenum chamber and the density of the gas in plenum chamber 70, and balloon structure 76 is bulged with the increase in pressure. To decrease the focal length of the lens, the controls of the high pressure regulator 26 and pop-off valve 72 are adjusted to the desired lower pressure so that gas escapes from the plenum chamber and the balloon structure by way of pop-off valve 72 until the desired lower pressure is reached. It is also pointed out that if small leaks develop, additional gas will be provided by high pressure regulator 26 to maintain the pressure in chamber 70 and balloon structure 76. On the other hand, if the pressure tends to increase due to heating from external means such as absorption of laser energy or from sunlight, then pop-off valve 72 will release this pressure and allow some gas to escape so as to maintain the pressure substantially constant. Once inflated, this lens can be maintained in an inflated and erected position for use for long periods of time and require only very little additional gas for maintaining the lens in the inflated condition. It therefore is readily adaptable for use with cw high energy laser.

In the embodiment of FIGS. 3 through 5, it is pointed out that the material of balloon structure 76 will have little effect on the optical quality of the lens because of its being quite thin and made of materials like vinyl chloride/vinylidene chloride copolymer thin films (Saran wrap) may be used for wavelengths in the visible and near infrared regions. Several polymer materials exist for infrared, milimeter, and microwave regions. However, in the midinfrared region between about 2 $\mu$m and 20 $\mu$m material for this application are only now being developed. However, mylar may be used at 10.6 $\mu$m which is one of the most important laser wavelengths.

The gas to be used in lenses of this invention depend on the wavelength of the laser being used with the lens and the gases consist of $N_2$, $H_2$, $O_2$, A, Ne, He, etc. Although it may be desired to use a heater with the hyrodynamic lenses of this invention to increase the amount of kinetic energy in the gas in the plenum chamber, a heater should not be required. But if desired and needed a heater can be provided as described in applicants' prior application Ser. No. 510,709.

We claim:

1. A large focusable gas lens for outer space applications comprising a plenum structure defining a plenum chamber, means for supplying gas to said plenum chamber at selected desired pressures for the gas pressure in said plenum chamber, said plenum chamber having means for communicating gas radially from said plenum chamber to define a gas lens radially of said plenum structure, and said plenum structure having pressure responsive means that moves linearly for responding to pressure in the plenum chamber to cause the focal length of the gas lens radially of the plenum structure to be increased or decreased as the pressure in said plenum chamber is increased or decreased.

2. A large focusable gas lens as set forth in claim 1, wherein said means for supplying gas includes a gas source, a fast acting valve, and an adjustable high pressure regulator; said means for communicating gas from said plenum chamber includes dynamic nozzles; and said pressure responsive means includes a piston about a portion of said plenum structure and being slidable relative to said plenum structure to expose or close off more or less of said dynamic nozzles as said piston is slid back or forth relative to said plenum structure.

3. A large focusable gas lens as set forth in claim 2, wherein said plenum chamber is fluidly interconnected to one side of said piston, and the other side of said piston has spring means biasing said piston in a direction opposite to the fluid acting on said one side of said piston; and radially projecting struts connected to said plenum structure and to end members that are interconnected by fins to define the gas lens area between the plenum structure and the fins.

4. A large focusable gas lens as set forth in claim 1, wherein said means for supplying gas includes a gas source, a fast acting valve, an adjustable high pressure regulator, and an adjustable pop-off valve; said gas source, said fast acting valve, and said adjustable high pressure regulator being connected to fluidly interconnect the supply to said plenum chamber, said adjustable pop-off valve being connected to said plenum chamber for venting pressure from said plenum chamber when the pressure exceeds the pressure for which the pop-valve has been set; said plenum structure including telescoping members that together define said plenum chamber therein; and said means for communicating gas to define a gas lens includes a balloon structure connected to said telescoping members to define a chamber in the balloon structure, and passages in said plenum structure for communicating the plenum chamber with the chamber in said balloon.

5. A large focusable gas lens as set forth in claim 4, wherein said pressure responsive means includes spring means which biases said telescoping members together and against the pressure in said plenum chamber; and said balloon structure including a seam at its outer periphery and strips connected at said seam and to said plenum structure to limit radial ballooning of said balloon structure.

* * * * *